United States Patent [19]

Dorgan et al.

[11] Patent Number: 4,848,186
[45] Date of Patent: Jul. 18, 1989

[54] DUAL HYDROSTATIC DRIVE TRANSMISSION

[75] Inventors: Robert J. Dorgan, Pittsfield, Mass.; David A. Wallace, Walla Walla, Wash.

[73] Assignee: General Electric Company, Pittsfield, Mass.

[21] Appl. No.: 137,480

[22] Filed: Dec. 23, 1987

[51] Int. Cl.$^4$ .............................................. F16H 47/04
[52] U.S. Cl. ........................................... 74/677; 74/687
[58] Field of Search ................ 74/687, 720, 718, 730, 74/677, 720.5

[56] References Cited

U.S. PATENT DOCUMENTS

| | | | |
|---|---|---|---|
| 3,052,098 | 9/1962 | Ebert | 74/687 X |
| 3,074,296 | 1/1963 | Ebert | 74/687 |
| 3,081,647 | 3/1963 | Blenkle | 74/687 |
| 3,085,448 | 4/1963 | Finlayson | 74/687 |
| 3,446,093 | 5/1969 | Orshansky | 74/687 |
| 3,455,183 | 7/1969 | Orshansky | 74/687 |
| 3,534,635 | 10/1970 | Polak | 74/687 |
| 3,575,066 | 4/1971 | Livezey | 74/720.5 |
| 3,583,256 | 6/1971 | Livezey | 74/720.5 |
| 3,592,077 | 7/1971 | Polak | 74/687 |
| 3,596,535 | 8/1971 | Polak | 74/720.5 |
| 4,129,005 | 12/1978 | Greene | 60/715 |
| 4,290,270 | 9/1981 | Meeh | 60/716 |
| 4,446,756 | 5/1984 | Hagin et al. | 74/677 X |

FOREIGN PATENT DOCUMENTS

| | | | |
|---|---|---|---|
| 705615 | 5/1962 | Canada | 74/687 |
| 0153612 | 9/1985 | European Pat. Off. | 74/687 |
| 1177571 | 9/1985 | U.S.S.R. | 74/720.5 |
| 853197 | 11/1960 | United Kingdom | 74/720 |

*Primary Examiner*—Dwight G. Diehl
*Assistant Examiner*—Christopher C. Campbell
*Attorney, Agent, or Firm*—Bailin L. Kuch; Robert A. Cahill

[57] ABSTRACT

A hydrostatic transmission includes a mechanically driven hydraulic pump connected in hydraulic circuit with first and second hydraulic motors. The hydrostatic outputs of the first and second motors are respectively applied to the ring and sun gears of a planetary gear set whose carrier constitutes the transmission hydrostatic output. Acceleration under low speed, high torque conditions is achieved by varying the displacements of the pump and second motor, while the first motor is removed from the hydraulic circuit and the ring gear is braked. At an appropriate shift point, the first motor is inserted into the hydraulic circuit and the ring gear is released, such that further acceleration is achieved by varying the displacements of the pump and both motors in coordination.

16 Claims, 1 Drawing Sheet

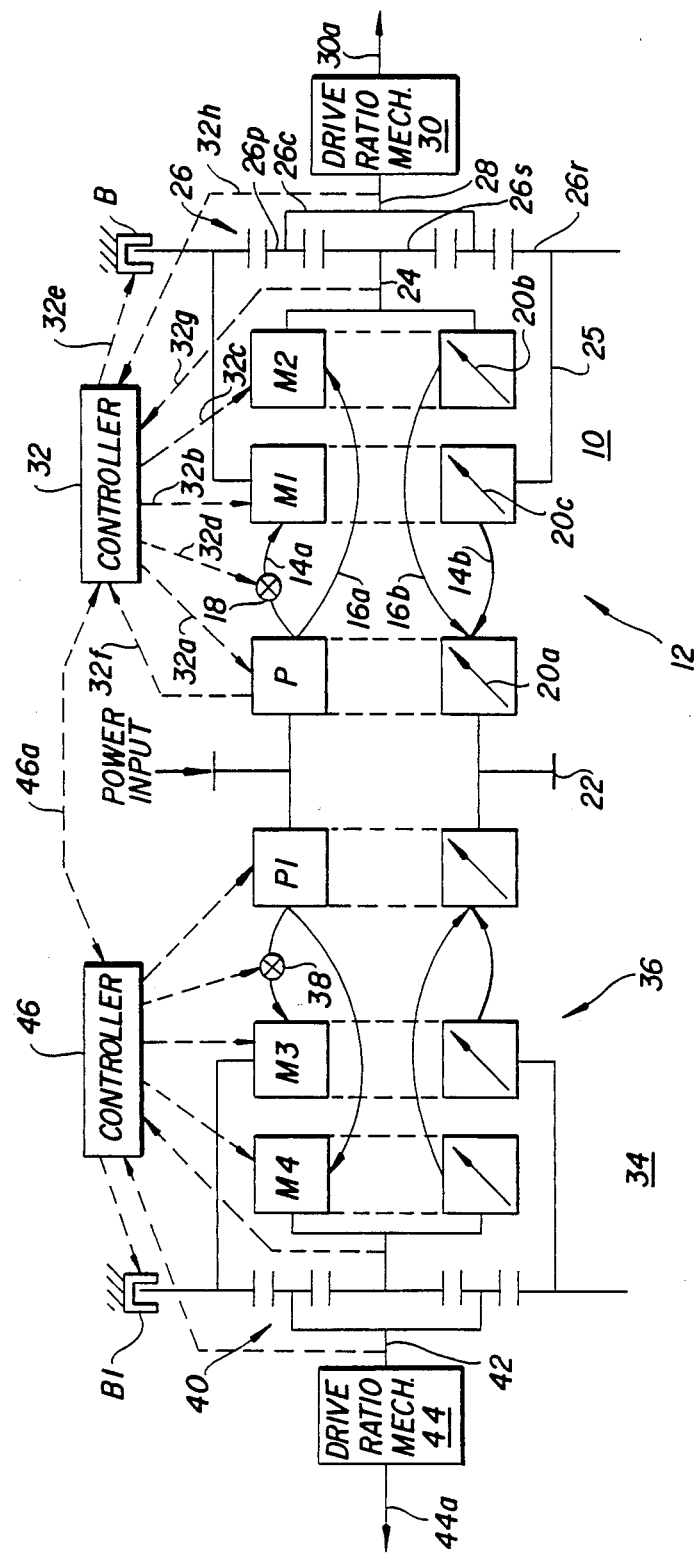

4,848,186

DUAL HYDROSTATIC DRIVE TRANSMISSION

BACKGROUND OF THE INVENTION

The present invention relates to hydrostatic transmissions and particularly to a tramsmission whose output drive is optimally dervied from the selective combination of plural hydrostatic outputs.

Pure hydrostatic transmissions typically utilize a single mechanically driven hydraulic pump connected in hydraulic fluid circuit with a single hydraulic motor to develop a hydrostatic transmission output which, by varying the displacement of one or both of these hydraulic devices, can be infinitely variable in speed. The hydraulic capacities, i.e., maximum displacements, of the pump and motor are determined by the torque and speed requirements of a particular load. To satisfy high load torque demands, their hydraulic capacities must be large, and thus the pump and motor must both be of large physical size. As such, their hydraulic and mechanical losses are significant. Then, at high output speeds, the centrifugal forces and moments of a large hydraulic motor rotating at high speeds become a serious problem.

To alleviate the problems associated with high capacity hydraulic pump and motor hydrostatic drive units, hydromechanical drives or transmissions have been developed and are now in wide use. Transmissions of this type utilize a mechanical input from a prime mover which is combined with the hydrostatic output from a prime mover-driven hydraulic driven unit in a shiftable cdombining gear set to develop a multiple-range, infinitely variable hydromechanical output for driving a load.

While hydromechanical transmissions are well suited for a wide variety of applications, they are relatively complex and costly to manufacture. They futher require a mechanical drive connection from the prime mover to the transmission output, while a hydrostatic transmission can use oil lines which are more adaptable to complex transmission configurations. Moreover, certain applications do not required the versatility and high speed propulsion afforded by hydromechanical transmissions, and thus, for these applications, their expense is not justified.

It is accordingly an object of the present invention to provide an improved hydrostatic transmission.

A further object is to provide a hydrostatic transmission of the above-character which has enhanced operating efficiencies.

An additional object is provide a hydrostatic transmission of the above-character which has improved operating performance.

Yet another object is to provide a hydrostatic transmission of the above-character which possesses improved torque-speed operating characteristics.

Another object is to provide a hydrostatic transmission of the above-character which is compact in size and light in weight.

A still further object is to provide a hydrostatic transmission of the above character which is inexpensive to manufacture, readily adaptable to a variety of load applications and reliable over a long operating life.

Other objects of the invention will in part be obvious and in part appear hereinafter.

SUMMARY OF THE INVENTION

In accordance with the present invention, there is provided a hydrostatic transmission including a hydraulic pump driven by a suitable prime mover and connected in hydraulic circuit with at least first and second hydraulic motors. The hydrostatic outputs of these two motors are combined by a suitable gear set at respectively different gear ratios to develop a purely hydrostatic transmission output. A controller is programmed to selectively disable the first motor such that only the second motor, whose hydrostatic output is delivered to the transmission output at the higher numerical of the two gear ratios, is driven by the pump under high torque load and thus high hydraulic pressure conditions. In addition, the gear element of the gear set driven by the hydrostatic output of the first motor is brake to provide a reaction force for the gear set and to isolate this motor from high load torque demand.

Acceleration is achieved via appropriate variations in the displacements of the pump and the second motor, as controlled by the controller. At an appropriate shift point during such acceleration, the controller disengages the brake and inserts the first motor into its hydraulic circuit with the pump when the displacements of the two motors are such that their respective pressure ratios are substantially equal. A torque balance is thus achieved between the hydrostatic outputs of the two motors to provide a smooth shift into a higher speed range during which acceleration is achieved by varying the displacement of the pump alone or the displacements of the pump and the two motors in coordination.

The invention accordingly comprises the features of construction, combination of elements, arrangement of parts, and the method of controlling same, all of which will be exemplified in the description hereinafter set forth, and the scope of the invention will be indicated in the claims.

For a fuller understanding of the nature and objects of the invention, reference may be had to the following detailed description taken in conjunction with the accompanying drawing, in which the sole figure is a schematic illustration of a hydrostatic transmission constructed in accordance with the present invention.

DETAILED DESCRIPTION

Referring to the drawing, the hydrostatic drive transmission of the present invention, generally indicated at 10, includes a hydraulic drive unit generally indicated at 12 and consisting of a hydraulic pump P and a pair of hydraulic motors M1 and M2. This hydraulic drive unit may utilize hydraulic pump and motor devices of the positive displacement, ball piston type interconnected in a closed loop hydraulic fluid circuit such as disclosed in Reed U.S. Pat. No. 3,815,698, the disclosure of which is specifically incorporated herein by reference. I will be understood that other types of infinitely variable displacement hydraulic pump and motor devices, such as axial piston types, may be utilized.

In accordance with an important feature of the present invention, hydraulic pump P is adapted to drive both hydraulic motors M1 and M2. Thus, pump P is connected in hydraulic fluid communication with motor M1, as indicated by the arrows 14a, 14b and connected in hydraulic fluid communication with motor M2, as indicated by arrows 16a, 16b. For purposes set forth below, hydraulic fluid communication between the pump and motor M1 is selectively blocked by suitable means, such as a valve 18. As indicated by arrow 20a, pump P is capable of having its displacement infinitely varied or "stroked" as it is termed in the art. The same is true of at least of motor M2, as indicated by arrow 20b, and preferably also of motor M1, as indicated by arrow 20c.

Pump P is mechanically drven at preferably constant speed by a suitable prime mover (not shown), such as an internal combustion engine, via a transfer gear 22. The infinitely variable speed hydrostatic output of motor M2 is developed on a shaft 24, while the infinitely variable speed hydrostatic output of motor M1 is developed on a sleeve shaft 25. These hydrostatic outputs are combined by suitable output gearing, such as a planetary gear set, generally indicated at 26 and including a sun gear 26s, pinion gears 26p, a pinion gear carrier 26c, and a ring gear 26r. In the illustrated embodiment of the invention, the hydrostatic output of motor M2 on shaft 24 drives sun gear 26s, and the hydrostatic output of motor M1 on sleeve shaft 25 drives ring gear 26r. The combined hydrostatic output is developed on carrier 26c, which is connected to transmission output shaft 28. If desired, this output shaft may be connected to a suitable drive ratio mechanism 30 comprising fixed or changeable ratio arrangements of gears, chains, belts or the like to achieve the requisite speed and torque ratios for a particular load driven off of shaft 30a. A brake B is adapted to selectively ground ring gear 26r of planetary gear set 26. Completing the description of transmission 10, a controller 32 is provided to control the strokings (displacement variations) of pump P via link 32a, ring gear motor M1 via link 32b, and sun gear motor M2 via link 32c, to control the position of valve 18 via link 32d, and the condition of brake B via link 32e, all in response to the hydraulic pressure in hydraulic drive unit 12 read via link 32f, the sun gear motor output speed on shaft 24 read via link 32g, and the transmission output speed on shaft 28 read via link 32h.

To operate transmission from a standing start, valve 18 is closed by controller 32 to interrupt hydraulic fluid communication between pump P and ring motor M1, and thus this hydraulic motor is disabled. The controller also activates brake B to groud ring gear 26r and thus provide a reaction force for planetary gear set 26, as well as to protect ring motor M1 from the typically high torque loads at startup. Also at startup, the controller sets pump P at zero or minimum stroke (zero displacement) and the sun and ring motors both at full or maximum stroke (maximum displacement). With the pump up zero stroke, transmission 10 is effectively in a lock neutral condition. The pump capacity (maximum displacement) can be somewhat less than the combined capacities of the two motors, while the ring motor can be of slightly larger capacity than the sun motor. To being driving the load connected to transmission output shaft 28 (or shaft 30a), pump P is stroke upwardly (displacement increased) to pump hydraulic fluid to sun motor M2, which then begins rotating to develop a hydrostatic output on shaft 24. This output appears on transmission output shaft 28 as the sun-to-carrier reduction imposed by planetary gear set 26. It will be appreciated that shaft 28 can be driven in either a forward or reverse direction depending upon the direction in which hydraulic fluid is pumped in the hydraulic loop circuit for sun motor M2.

As the pump is stroked upwardly by controller 32, the speed of sun motor M2 increases, and the load driven via transmission 10 is accelerated. Upon achieving a particular hydrostatic output speed on shaft 24 or a particular relationship between this output speed and hydraulic fluid pressur, determined pursuant to optimizing operating efficiency, controller 32 begins downstroking sun motor M2. This transition point may occur, for example, when pump P reaches approximately one-quarter stroke. As the sun motor is stroked downwardly, either alone or in conjunction with continued upstroking of pump P as dictated by controller 32, the speed of the hydrostatic output on shaft 24 increases, as does the transmission output speed on shaft 28, but at the sun-to-carrier reduction of planetary gear set 26. At some transition point during the downstroking of sun motor M2, it will achieve a pressure ratio (ratio of transmission output torque to hydraulic pressure) which is equal to the pressure ratio that ring motor M1 would be subjected to if valve 18 was open and brake B disengaged. This second tansition may occur, for example, when the sun motor has been downstroked to 60% stroke and is predicated on the relative capacities of the two motors, the hydraulic fluid pressure, torque demand, hydraulic circuit loss characteristics, the gear ratio of planetary gear set 26, and sun motor hydrostatic output speed. It will be recalled that until this second transition point is reached, ring motor M1 is effecitively removed from the hydraulic circuit by valve 18 and is sitting at full stroke. Since the hydrostatic output of the ring motor on sleeve shaft 25 is transmitted to the transformer output shaft 24 through a lower numerical gear ratio (ring-to-carrier) than is the sun motor hydrostatic output (sun-to-carrier), the ring motor is at a relative mechanical disadvantage and thus would see a higher torque if it were in the hydraulic circuit. However, by programming controller 32 to open valve 18 and release brake B to effectively insert ring motor M1 at full stroke into hydraulic drive unit 12 at the point in the downstroking of sun motor M2 when their pressure ratios are substantially equal, a torque balance is achieved. The now enabled ring motor then begins developing its hydrostatic output to assume its equal share of the load torque on output shaft 28. Under these circumstances, the insertion of the ring motor into the hydraulic drive unit 12 at this second transition point, which may be considered as a shift from a from a first speed range to a second speed range, can be effected as a continuous ratio change.

To accelerate a load beyond this second transition or range shifting point, upstroking of pump P1 is continued while the motors M1 and M2 are downstroked in a coordinated manner to maintain substantial torque balance, i.e., equal pressure ratios, all under the control of controller 32. It will be appreciated that upstroking of the pump and coordinated downstrokings of the motors may also effected successively, rather than concurrently, to produce acceleration beyond the second transition point. While the ring motor M1 has been disclosed as having a variable displacement capability, i.e., strokeable. it will be appreciated that it may be a fixed displacement hydraulic motor. In this case, when the sun motor is stroked down to the second transition point where its pressure ratio becomes equal to that of the fixed capacity ring motor, and the latter is then inserted into hydraulic drive unit 12, i.e., valve 18 opened, and brake B released, acceleration beyond the second transition point would be effected solely by continued upstroking of the pump. It will be appreciated that downstroking of the sun motor beyond the second transition point would alter its torque balance with a fixed displacement ring motor, and thus is preferably avoided. Sinve only the pump is stroked to increase speed beyond the second transition point, the maximum transmission output speed obtainable on shaft 28 is less than the case wherein both motors are also downstroked. It will be understood that, upon decelerating through the second transition point, controller 32 effects engagement of brake B and closure of valve 18 at this shift point, with continued deceleration achieved by upstroking sun motor M2 and downstroking pump P.

From the description thus far, it is seen that the combined by hydrostatic output on shaft 28 may be connected directly or indirectly via drive ratio mechanism 30 to drive a variety of loads, such as a vehicle, a machine tool, etc. In the case of a vehicle, this transmission drive could be applied to a pair of driving wheels via suitable differential gearing.

The remainder of the figure illustrates the application of the invention as a hydrostatic steering transmission for a skid-steered, tracklaying vehicle, such as crawler tractor. This arrangement would be equally suitable for wheeled, skid-steer vehicles. To this end, transmission output shaft 28 (or shaft 30a) is applied to drive the right vehicle track (wheels), and a second hydrostatic drive transmission unit 34, identical to transmission unit 10 and including a hydraulic drive unit 36, is provided to drive the left vehicle track (wheels). These transmission units are driven in parallel by the same prime mover input via transfer gear 22. Hydraulic pump P1 of transmission unit 34 is connected in hydraulic fluid communication with hydraulic motors M3 and M4 in the identical fashion described above for pump P and motors M1 and M2. Thus the fluid connection of pump P1 with motor M3 is valved, as indicated at 38. The hydrostatic output of motor M4 is connected to drive the sun gear of a left output planetary gear set 40 which is identical to planetary gear set 26. The hydrostatic output of motor M3 is connected to drive the ring gear of planetary gear set 40, with its pinion gear carrier connected to drive left output shaft 42. This output shaft drives the left vehicle track (wheels) directly or indirectly via drive ratio mechanism 44 and its output shaft 44a. Brake B1 is positioned to selectively ground the ring gear of planetary gear set 40. While a second controller 46 is shown for transmission unit 34, it will be appreciated that in practice a single controller would control both transmission units 10, 34 in response to operator commands.

It will be appreciated that, with valves 18, 38 closed and brakes B, B1 engaged, if hydraulic drive unit 36 is stroked by controller 46 in coordination with the stroking of hydraulic drive unit 12 by controller 32, as indicated by link 46a, in the manner described above, straight line vehicle propulsion in the desired forward or reverse direction is achieved. Coodinated strokings of these hydraulic drive units in the manner described above with brakes B, B1 released and valves 18, 34 opened at the second transition or shift point then produces straight line second range vehicle propulsion. To effect a steer, the hydraulic drive units 12 and 36 are appropriately differentially stroked to produce a desired speed differential on the right and left transmission output shafts 28 and 42. It will be readily appreciated that this speed differential can be effected while operating either below or above the second transition point and in either the forward or reverse propulsion direction.

From the foregoing description, it is seen that the present invention provides a hydrostatic drive transmission of improved efficiency, compact size, and lighter weight. The utilization of two smaller hydraulic motors and a hydrostatic output combining gear set, rather than a single large hydraulic motor, to satisfy a given load torque requirement significantly reduces motor frictional losses and hydraulic leakage. This is seen from the fact that under low speed, high load torque and thus high hydraulic pressure conditions, i.e., below the second transition point, only the sun motor M2 is in the hydraulic circuit, and thus its losses (hydraulic leakage and mechanical) will inherently be significantly less than that of a single large hydraulic motor. Also, since ring motor M1 is removed from the hydraulic circuit during this high hydraulic pressure period, it can not be a source of hydraulic fluid leakage. In fact, by virtue of the present invention, the sum of the hydraulic capacities of the sun and ring motors may be less than the hydraulic capacity of a single large motor. Moreover, since the pump P may have a smaller hydraulic capacity than the combined hydraulic capacities of the two motors M1, M2, its size can be significantly less than that of a pump driving a single, large hydraulic motor. This represents additional savings in losses (hydraulic and mechanical), size and weight. While the disclosed embodiment of the invention utilizes one hydraulic pump to drive two hydraulic motors, it will be appreciated that, with a more elaborate hydrostatic output combining gear arrangement, three or more hydraulic motors driven by one or several hydraulic pumps could be utilized to drive a single load a or multiple loads.

It is therefore seen that the objects set forth above, including those made apparent from the preceding description, are efficiently attained, and, since certain changes may be made in the disclosed embodiment and in the method in which it is operated, it is intended that all matters contained in the above description and shown in the accompanying drawing be interpreted as illustrative and not in a limiting sense.

Having described the invention, what is claimed as new and desired to secure by Letters Patent is:

1. A hydrostatic transmission having an output shaft and comprising, in combination:
  A. a hydraulic pump adapted to be driven by a mechanical input and having a variable hydraulic displacement capability;
  B. a first hydraulic motor connected in hydraulic fluid flow communication with said pump for developing a first hydrostatic output;
  C. a second hydraulic motor connected in fluid communication with said pump for developing a second hydrostatic output and having a variable hydraulic displacement capability;
  D. a combining gear set including a first gear element driven by said first hydrostatic output, a second gear element driven by said second hydrostatic output and a third gear element for developing a combined hydrostatic output on said transmission output shaft, the ratio of said first to third gear elements being different than the ratio of said second to third gears elements;
  E. means for selectively disabling said first motor; and
  F. a controll operating to selectively control said disabling means and to controllably vary the hydraulic displacements of said pump and and said second motor, whereby to accelerate a load drivingly connected with said transmission output shaft.

2. The hydrostatic transmission defined in claim 1, wherein said first motor has a variable hydraulic displacement capability, said controller controllably varies the hydraulic displacements of both said first and second motors.

3. The hydrostatic transmission defined in claim 2, wherein said combining gear set is a planetary gear set.

4. The hydrostatic transmission defined in claim 3, wherein said first gear element is a ring gear, said seond gear element is a sun gear, and said thrid gear element is a pinion gear carrier of said planetary gear set.

5. The hydrostatic transmission defined in claim 4, wherein said disabling means includes a brake for selectively engaging and disengaging said ring gear.

6. The hydrostatic transmission defined in claim 5, wherein said disabling means further includes valve means for selectively blocking hydraulic fluid flow communication between said pump and said first motor.

7. The hydrostatic transmission defined in claim 6, which further includes separate means for sensing the speed of said second hydrostatic output and the hydraulic pressure in said pump, said controller varies the hydraulic displacements of said pump and said motors and selectively conditions said valve and said brake in respone to the speed of said second hydrostatic output and the hydraulic fluid pressure in said pump as indicated by said separate sensing means.

8. The hydrostatic transmission defined in claim 1, wherein said disabling means includes a brake for selectively inhibiting said first hydrostatic output.

9. The hydrostatic transmission defined in claim 1, wherein said disabling means includes means for selectively blocking hydraulic fluid communication between said pump and said first motor.

10. The hydrostatic transmission defined in claim 1, wherein said pump, said first and second motors, said combining gear set, and said first motor disabling means comprise a first hydrostatic transmission unit, driving connected with a first transmission output shaft, said hydrostatic transmission further including a second hydrostatic transmission unit identical to said first hydrostatic transmission unit and drivingly connected with a second transmission output shaft, said first and second hydrostatic transmission units adapted to be commonly driven by said mechanical input and said controller controlling said first and second hydrostatic transmission units to provide propulsion and steering for a skid-steer vehicle.

11. A method of controlling as hydrostatic transmission including a mechanically driven, variable displacement hydraulic pump, a first, variable displacement hydraulic motor in hydraulic fluid flow communication with said pump for developing a first hydrostatic output, a second, variable displacement hydraulic motor in hydraulic fluid flow communication with said pump for developing a second hydrostatic output, and a gear set for combining said first and second hydrostatic outputs to produce a transmission hydrostatic output to a load, said method comprising the steps of:

A. setting the hydraulic displacement of said pump to substantially zero;
B. setting the hydraulic displacement of said first motor to substantially maximum displacement;
C. setting the hydraulic displacement of said second motor to substantially maximum displacement;
D. disabling said first motor;
E. increasing the hydraulic displacement of said pump and decreasing the hydraulic displacement of said second motor to develop said second hydrostatic output at said transmission hydrostatic output for accelerating the load from a standing start;
F. enabling said first motor when the pressure ratio of said second motor reaches substantial equality with the pressure ratio of said first motor; and
G. further increasing the hydraulic displacement of said pump to develop the combination of said first and second hydrostatic outputs at said transmission hydrostatic output for continued acceleration of the load.

12. The method defined in claim 11, which further includes the step of
H. decreasing the hydraulic displacements of said first and second motors in coordination to maintain said substantial pressure ratio equality while further accelerating the load.

13. The method defined in claim 12, wherein step G. and H. are performed concurrently.

14. The method defined in claim 12, wherein said first motor disabling step includes braking said first hydrostatic output, and said first motor enabling step includes unbraking said first hydrostatic output.

15. The method defined in claim 14, wherein said first motor disabling step further includes blocking hydraulic fluid flow communication between said pump and said first motor, and said first motor enabling step further includes unblocking hydraulic fluid flow communication between said pump and said first motor.

16. The method in claim 12, wherein said first motor disabling step further includes blocking hydraulic fluid flow communication between said pump and said first motor, and said first motor enabling step further includes unblocking hydraulic fluid flow communication between said pump and said first motor.

* * * * *